(12) United States Patent
Bestle

(10) Patent No.: US 6,809,660 B2
(45) Date of Patent: Oct. 26, 2004

(54) KEYPAD AND ELECTRONIC DEVICE

(75) Inventor: Nikolaj Bestle, Calabasas, CA (US)

(73) Assignee: Nokia Mobile Phones Limited, Espoo (FI)

(*) Notice: Subject to any disclaimer, the term of this patent is extended or adjusted under 35 U.S.C. 154(b) by 455 days.

(21) Appl. No.: 09/880,814

(22) Filed: Jun. 15, 2001

(65) Prior Publication Data

US 2002/0003482 A1 Jan. 10, 2002

(30) Foreign Application Priority Data

Jun. 30, 2000 (GB) .............................................. 0016159

(51) Int. Cl.⁷ ............................................ H03M 11/00
(52) U.S. Cl. ............................ 341/20; 341/22; 361/680; 345/168; 345/171; 200/5 A; 200/512; 200/513; 379/368; 379/433.06; D14/247
(58) Field of Search ..................... 341/20, 22; 200/5 A, 200/512, 513; 361/680; 345/168, 171; 379/433.06, 433.07, 368; D14/247, 393

(56) References Cited

U.S. PATENT DOCUMENTS 5,220,521 A    6/1993    Kikinis

FOREIGN PATENT DOCUMENTS

| EP | 0 503 197 A2 | 11/1991 |
| EP | 1 014 409 A2 | 6/2000 |
| GB | 2 239 629 A | 7/1991 |

*Primary Examiner*—Albert K. Wong
(74) *Attorney, Agent, or Firm*—Antonelli, Terry, Stout & Kraus, LLP

(57) ABSTRACT

The present invention discloses a keypad (25) for an electronic device including a plurality of fingers (26,27,28) having a splayed open configuration and a plurality of keys (31) on each finger (26,27,28). The fingers (26,27,28) are moved into a closed configuration when the keypad 25 is installed in said electronic device such that a key (31) on at least one finger (26,27,28) is positioned in close proximity or is contiguous to a key (31) on an adjacent finger (26,27,28).

16 Claims, 6 Drawing Sheets

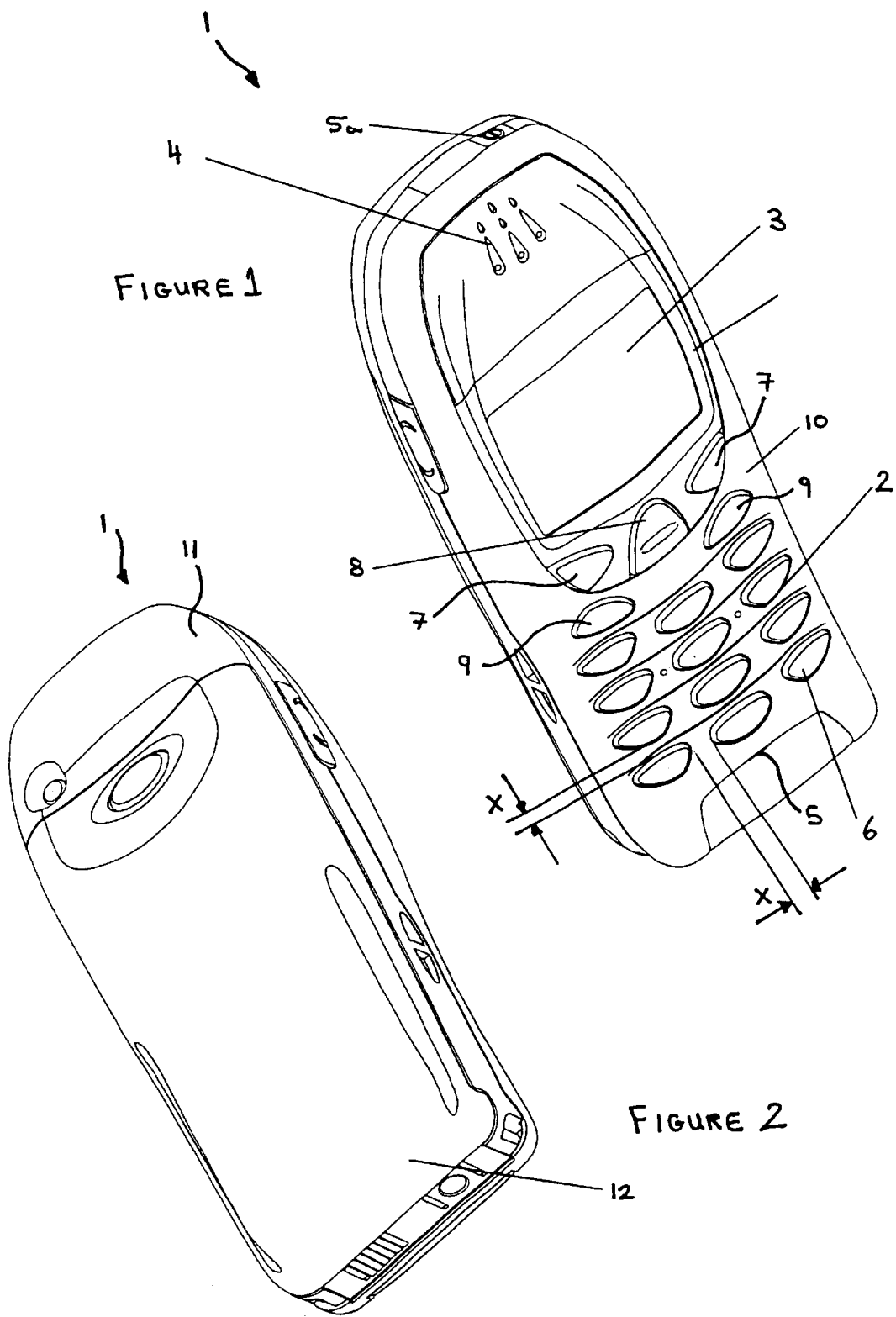

KEYPAD AND ELECTRONIC DEVICE

FIELD OF THE INVENTION

The present invention relates to a keypad for an electronic device and to an electronic device incorporating the keypad. In particular, the electronic device to which this invention relates is a mobile communication device such as a telephone but it could also be any other type of electronic device that incorporates a keypad including, for example, a personal data assistant (PDA) or a television/stereo remote control unit.

BACKGROUND OF THE INVENTION

A conventional mobile telephone includes a plurality of buttons or keys having numbers and other symbols printed thereon to designate the function that each key performs when pressed. For example, the keys bearing the numbers 0 to 9 can be used to input a telephone number into the telephone. These keys protrude through apertures in the housing of the mobile telephone and are spaced from each other and give the appearance that each key is a separate component. However, the keys are all integrally moulded in one piece of flexible material such as rubber and extend from the surface of a flat sheet mounted on the electric circuitry inside the telephone housing. The moulded component forming the desired arrangement of keys is known as a keypad or key-mat. Typical keypads of the type described are known from U.S. D421,019 and U.S. Pat. No. 5,940,015.

It will be apparent that the majority of all known keypads are constructed with a space between each key. As the keypads are made in a moulding process, the distance between each key often represents the minimum distance achievable due to the thickness of the wall between the keys in the mould which cannot be reduced below a minimum otherwise the mould will fail. However, owing to design considerations and in attempts to reduce the size of mobile telephones to a minimum, it has now become desirable to manufacture keypads having keys that are positioned much closer together than is possible with the conventional moulding technique. In some applications, it is also desirable to position the keys so that their edges wholly or partially abut each other so that the sides of the keys are in physical contact or are contiguous.

To date, the above requirement has been met by moulding the keys separately and then individually gluing or otherwise attaching them in the required close proximity onto a flat sheet to form the keypad. However, it will be readily appreciated that this is a time consuming laborious process and it becomes very expensive and complicated especially when a large quantity of keypads are to be manufactured. U.S. Pat. No. 5,546,457 discloses a conventional keypad made using this technique.

SUMMARY OF THE INVENTION

According to the present invention, there is provided a keypad for an electronic device comprising a plurality of splayed fingers, a plurality of keys on each finger wherein the fingers adopt a non-splayed configuration when the keypad is installed in said electronic device such that a key on at least one finger is positioned in close proximity to a key on an adjacent finger.

The keypad of the present invention is moulded using the conventional technique using a mould having a different shape. The wall of the mould between the keys is maintained at or above the minimum thickness required. Once the keypad is removed from the mould, the keys are positioned a distance apart that is less than the minimum wall thickness of a conventional mould by moving the splayed fingers together and maintaining them together when the keypad is installed in the electronic device.

In one embodiment, a key on at least one finger is contiguous with at least one key on an adjacent finger when the fingers adopt the non-splayed configuration.

Preferably, the keypad adopts the splayed open configuration when unconstrained, the fingers being constrained in the non-splayed configuration when the keypad is installed in said electronic device.

In a preferred embodiment, the keypad is a unitary component.

In one embodiment, each finger has a zigzag configuration along its edge where it contacts an adjacent finger when in the non-splayed configuration.

Preferably, at least one key on each finger extends to at least one edge of said finger where it contacts an adjacent finger when in the non-splayed configuration.

Preferably, there is an aperture in the keypad in the crook between a pair of fingers. This aperture prevents the material between the fingers joining them together from breaking as a result of the material splitting. It also prevents this area of the keypad from buckling when the fingers are in the non-splayed configuration.

In another embodiment, co-operating means are provided on two adjacent fingers to hold them in the non-splayed configuration.

Preferably, the co-operating means comprises a tongue on one finger and aperture on an adjacent finger through which the tongue extends in the non-splayed configuration.

The invention also provides an electronic device including a keypad according to the invention, wherein two or more keys protrude through a single aperture in the casing.

Preferably, said two or more keys are formed in a row and, most preferably, a number of rows extend through a corresponding number of openings in the casing.

According to the invention, there is also provided a method of installing a keypad in an electronic device according to any preceding claim, including the steps of:
a) taking the keypad having a plurality of splayed fingers from a mould;
b) moving the fingers together to form a non-splayed configuration;
c) mounting the keypad to the electronic device such that the fingers are retained in said non-splayed configuration.

BRIEF DESCRIPTION OF THE DRAWINGS

FIG. 1 is an illustration showing a perspective front view of a prior art mobile telephone;

FIG. 2 is an illustration showing a perspective rear view of the prior art mobile telephone shown in FIG. 1;

DETAILED DESCRIPTION OF THE PREFERRED EMBODIMENTS

Figure 3:
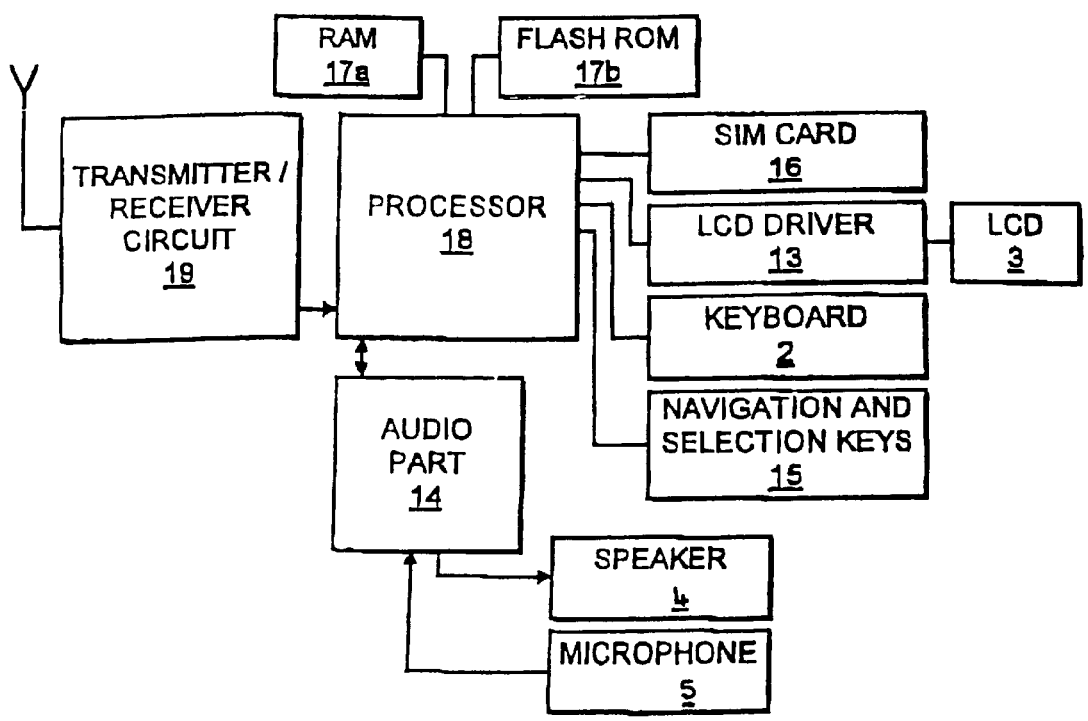
FIG. 3 is a schematic illustration the main components of the prior art mobile telephone shown in FIGS. 1 and 2 for connection to a cellular or cordless network.

An embodiment of the invention will now be described, by way of example only, with reference to FIGS. 5 to 8 of the drawings described above:

The general components and operation of a prior art mobile telephone 1 will now be described with reference to FIGS. 1 to 4. The telephone 1 comprises a user interface having a keypad 2, a display 3, ear piece 4, a microphone 5 and a on/off key 5a. The telephone 1 is adapted for communication via a wireless telecommunication network, e.g. a cellular network. However, the telephone 1 could also have been designed for a cordless network. The keypad 2 has a first group of keys 6 which are alphanumeric and by means of which a user can enter a telephone number, write a text message (SMS), write a name associated with a telephone number, etc. Each of the twelve alphanumeric keys 6 is provided with a figure "0–9" or a sign "#" or "*", respectively (not shown). In alpha mode, each key 6 is associated with a number of letters and special signs used in text editing. It will be appreciated that, in this prior art version of the mobile telephone, the keys 6 are all spaced from each other by a distance (X in FIG. 1) which is no less than the minimum wall thickness that must be maintained between the keys 6 in the mould in which the keypad is formed.

The keypad 2 additionally comprises two soft keys 7, the functionality of which depends on the state of the telephone and the navigation in the menu by means of a navigation key 8, and two call handling keys 9, which can be used for establishing a call or a conference call, terminating a call or rejecting an incoming call.

A rear view of the prior art mobile telephone shown in FIG. 1 is illustrated in FIG. 2 and it can be seen that the telephone 1 has a housing formed from two main components, a front casing 10 and a rear casing 11 partially formed from a removable battery pack 12. The telephone 1 has an internal antenna (not shown in the Figures).

FIG. 3 illustrates the main parts of the telephone 1 which is adapted for use in connection with a GSM network or any other telephone network. The telephone 1 may also configured to meet the wireless application protocol specification (WAP) agreed by most of the major telephone manufacturers and service providers that enables the telephone 1 to be used to access the internet. The microphone 5 produces analog electric signals corresponding to the user's speech and the analog signals are A/D converted in an A/D converter in the audio part 14. The digital speech signals are further encoded in the audio part 14 and transferred to a controller or processor 18 which forms an interface between peripheral components of the device, including a RAM memory 17a and a Flash ROM memory 17b, a SIM card 16, the display 3 and the keypad 2. The controller 18 communicates with a transmitter/receiver circuit 19. The audio part 14 also decodes digital speech signals which are transferred from the controller 18 to the speaker 4, via a D/A converter. The controller 18 is also connected to the keypad 2 and monitors the status of the telephone 1. If the status of the telephone 1 changes in response to, for example, a user activating a button on the keypad 2, the change is detected by the controller 18 and an indication of the change is shown on the display 3.

Figure 4:
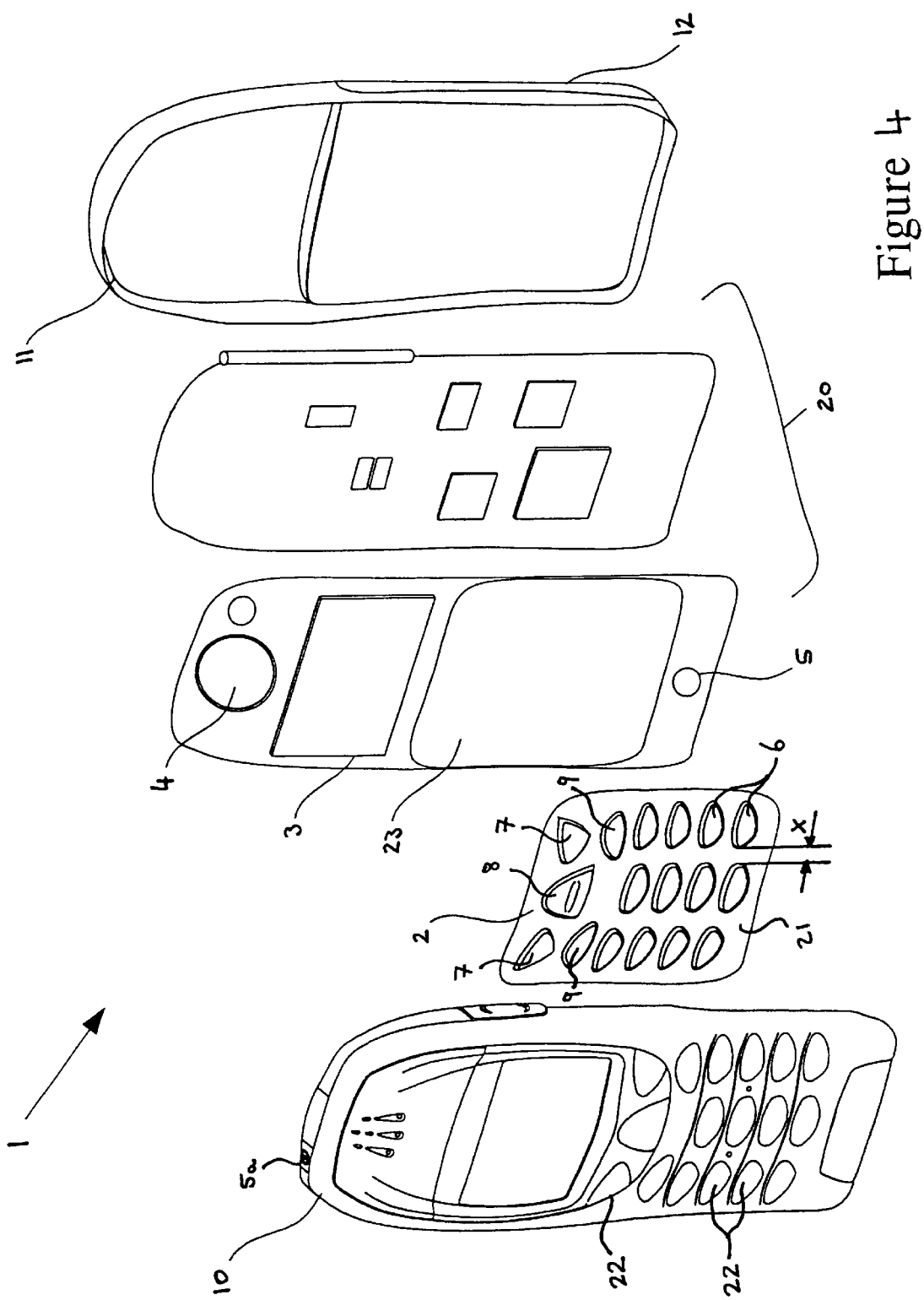
FIG. 4 illustrates an exploded perspective view of the prior art mobile telephone shown in FIGS. 1 and 2.

An exploded view of the components of the telephone illustrated in FIGS. 1 and 2 is shown in FIG. 4. Between the front and rear covers is disposed the mobile telephone circuitry 20 well known in the art, for example, in the Nokia range of mobile telephones. The whole of the keypad 2 can now be seen and it will be apparent that it is formed in one moulded piece from a resiliently deformable material with the keys 6 spaced from each other by a distance greater than or equal (distance X in FIG. 4) to the minimum wall thickness of the mould from which the keypad is formed. The flat sheet 21 from which each of the keys extend is disposed on keypad base part 23 of the circuitry 20. Each key 6, 7, 8, 9 is integrally moulded on its underside with activation pins (not shown) so that when depressed, switching means on the base part 23 associated with that particular key 6, 7, 8, 9 is activated to perform the desired function associated therewith. Apertures 22 in the front cover 10 corresponding to the positions of the keys 6 on the keypad are also visible in the Figure.

An embodiment of the invention will now be described with reference to FIGS. 5 to 8. It should be noted that the construction, operation and components of the mobile telephone 1 according to the invention are the same as that described above with reference to the prior art mobile telephone, with the exception of the keypad which is replaced with the keypad 25 according to the invention which will now be described in detail. It will be apparent that the construction of the front casing 10 through which the keys 6 extend must also be modified to accommodate the keypad 25 forming the subject of this invention so that a group of contiguous keys, or keys that are in close proximity, all protrude through a single aperture. The group may be a row of keys and there may be several groups of keys each group protruding through a single aperture in the casing.

Figure 5:
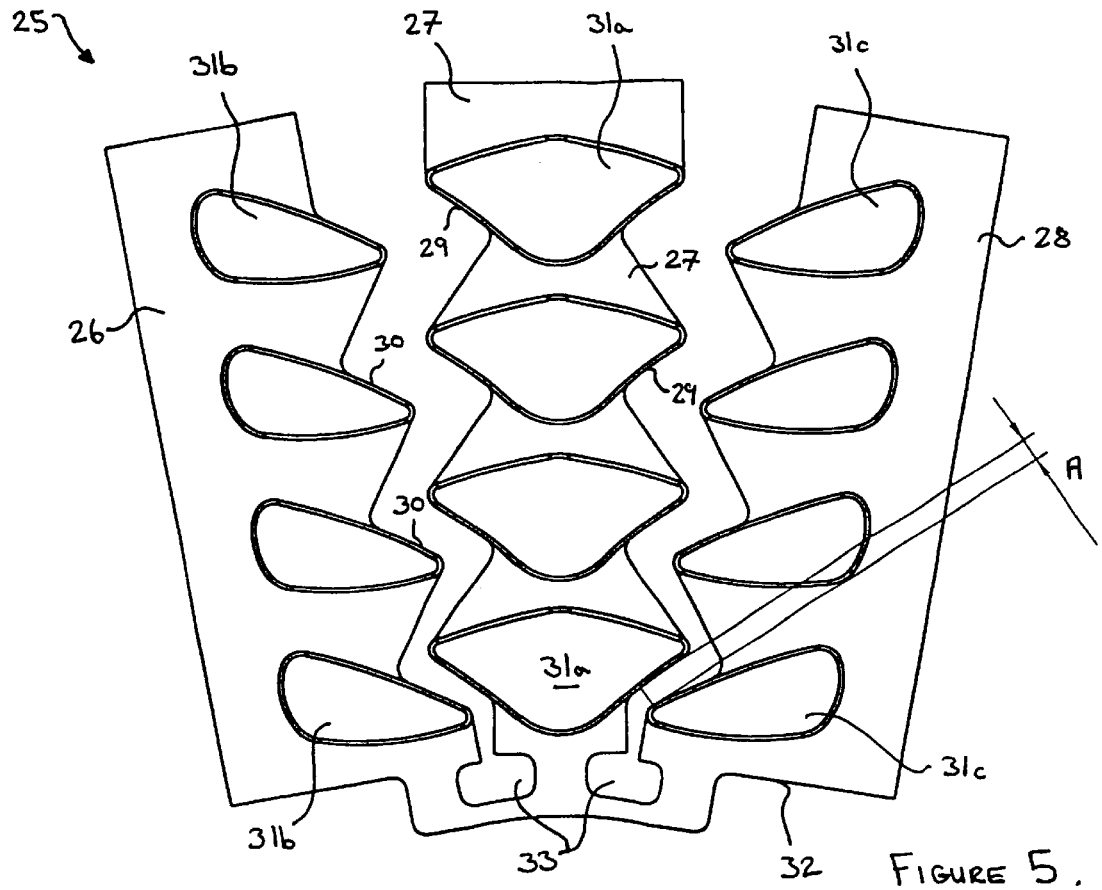
FIG. 5 illustrates a front plan view of a keypad for use in an electronic device according to the invention which, in the described embodiment is a mobile telephone, in the configuration in which it is moulded and leaves the mould.
Figure 6:
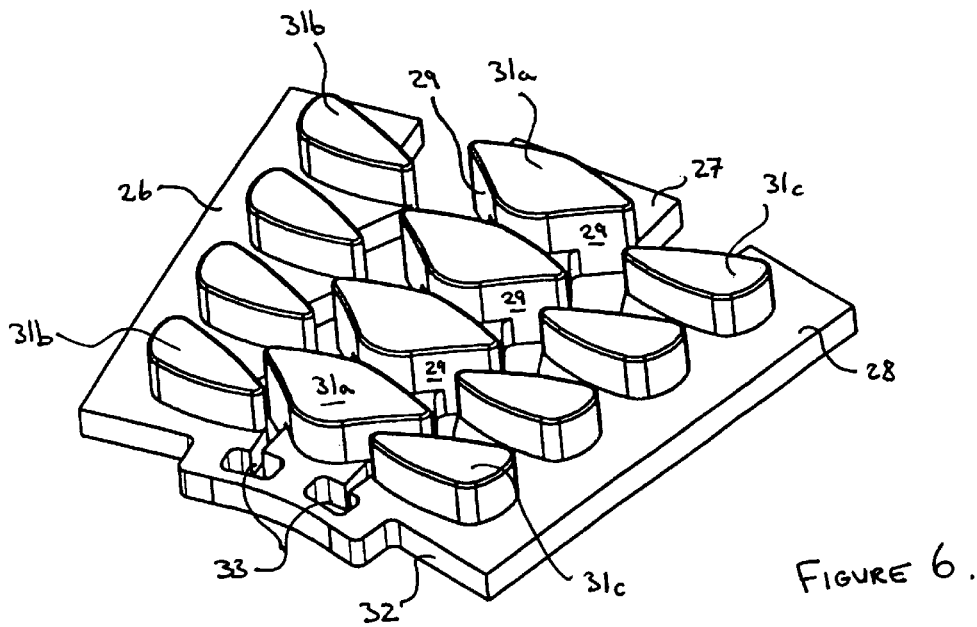
FIG. 6 illustrates a perspective view of the keypad shown in FIG. 5.

Referring to FIGS. 5 and 6, the keypad 25 of the invention is shown in the configuration in which it is moulded and leaves the mould. As with the prior art, the keypad 25 together with the keys 31 is moulded in one whole piece. It can be seen that the keypad is slit between each column of keys 31 to from three fingers or arms 26, 27, 28 that are splayed open. Each key 31a on the central finger 27 is moulded so that a portion of it extends right to the edge 29, or very close to the edge 29 of the central finger 27. Similarly, a portion of the keys 31b, 31c on the fingers 26 and 28 respectively, extend right to the edge 30 or very close to the edge 30 adjacent to the slit between the fingers 26, 27, 28. The keypad 25 is moulded with the fingers 26, 27, 28 in a splayed configuration which is sufficient to ensure that the distance (A in FIG. 5) between the lowermost key 31a on the central finger 27 and each of the lowermost keys 31b 31c on fingers 26, 28 across the slit is no less than the minimum wall thickness required by the mould.

The lower edge 32 of the keypad 25 is provided with an aperture 33 in the crook between the fingers 26, 27 and fingers 27, 28. Each slit communicates with one of the apertures 33. This arrangement prevents the slit from spreading to the lowermost edge 32 and separation of the fingers 26, 27, 28 from each other. In addition, the apertures 33 prevent buckling of the keypad 25 when the splayed fingers are closed for reasons which will now become apparent.

Figure 7:
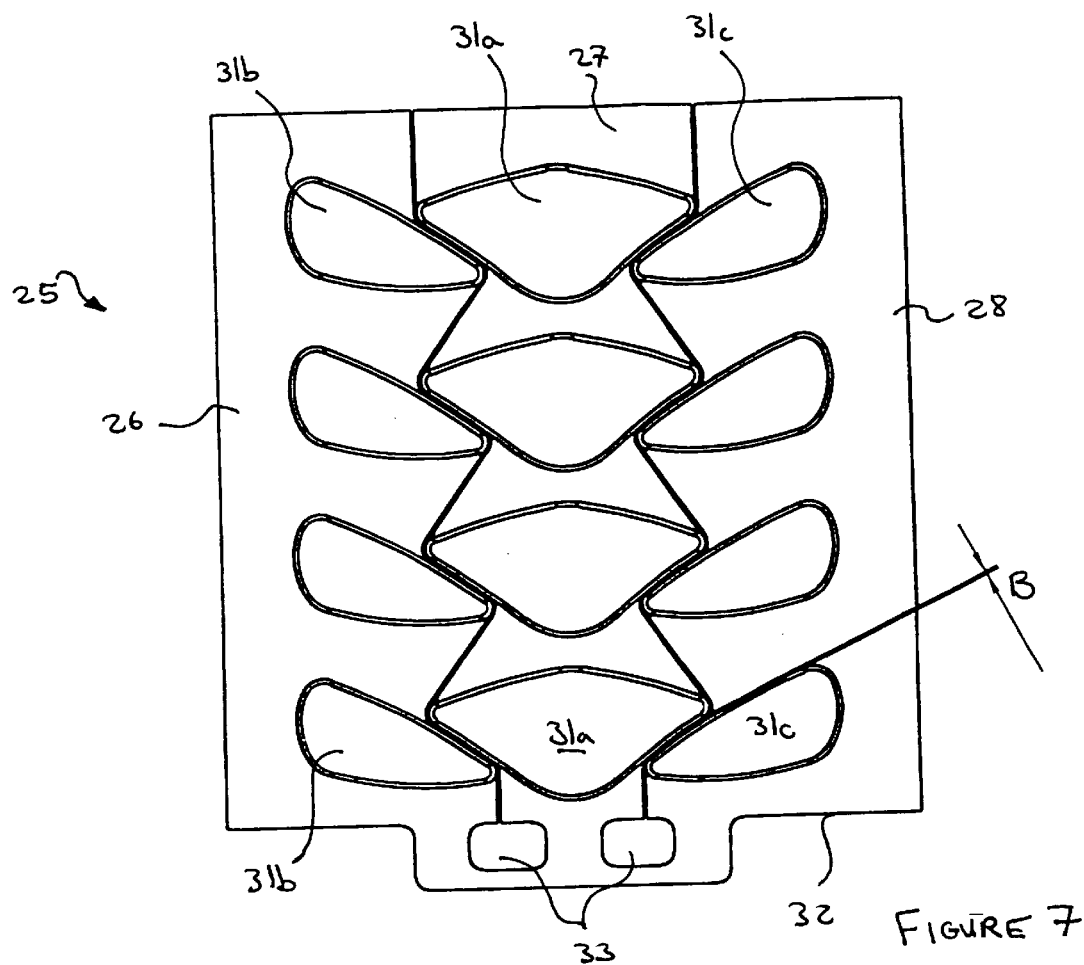
FIG. 7 illustrates a front view of the keypad shown in FIGS. 5 and 6 in a second configuration in which it is fitted in a mobile telephone for use.
Figure 8:
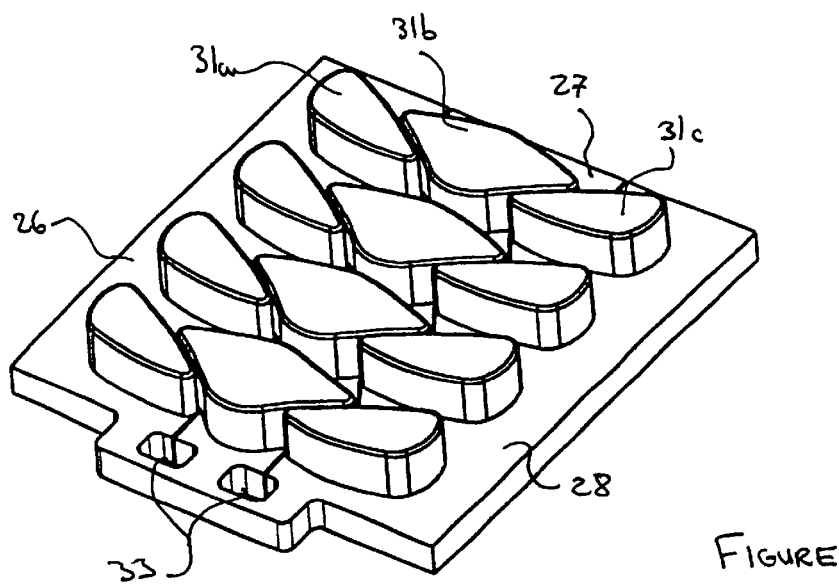
FIG. 8 is a perspective view of the keypad shown in FIG. 7.

The keypad 25 illustrated in FIGS. 5 and 6 is also shown in FIGS. 7 and 8 but in the orientation in which the keypad 25 is installed in a mobile telephone 1. It can be seen that the fingers 26, 27, 28 are no longer splayed open and have been closed together so that the central finger 27 is now in contact with fingers 26, 28 along the entire length of the slits. As can be seen, the keys 31a on the central finger are now contiguous with or positioned in close proximity to adjacent keys 31b, 31c on the fingers 26, 28, the distance between a key 31a on the central finger and a key 31b, 31c on one of the outside fingers (B in FIG. 7) now being substantially less than the minimum wall thickness between keys 31 required in the moulding process.

When the keypad 25 is removed from the mould in the orientation shown in FIG. 5, the fingers 26, 27, 28 are splayed open. To install the keypad 25 in a mobile telephone or other electronic device, the fingers 26, 27, 28 are brought together or closed. The fingers 26, 27, 28 may be held closed by being constrained by the sides of the telephone housing 10, 11 or by inserting the keys 31 through the apertures 22 in the front cover 10. Alternatively, the keypad 25 may be attached to the keypad base 23 using adhesive or other known fastening technique. In addition to the use of adhesive, or as a further alternative, the front cover 10 or keypad base 23 could be provided with pins that engage in holes in the keypad 25.

Figure 9:
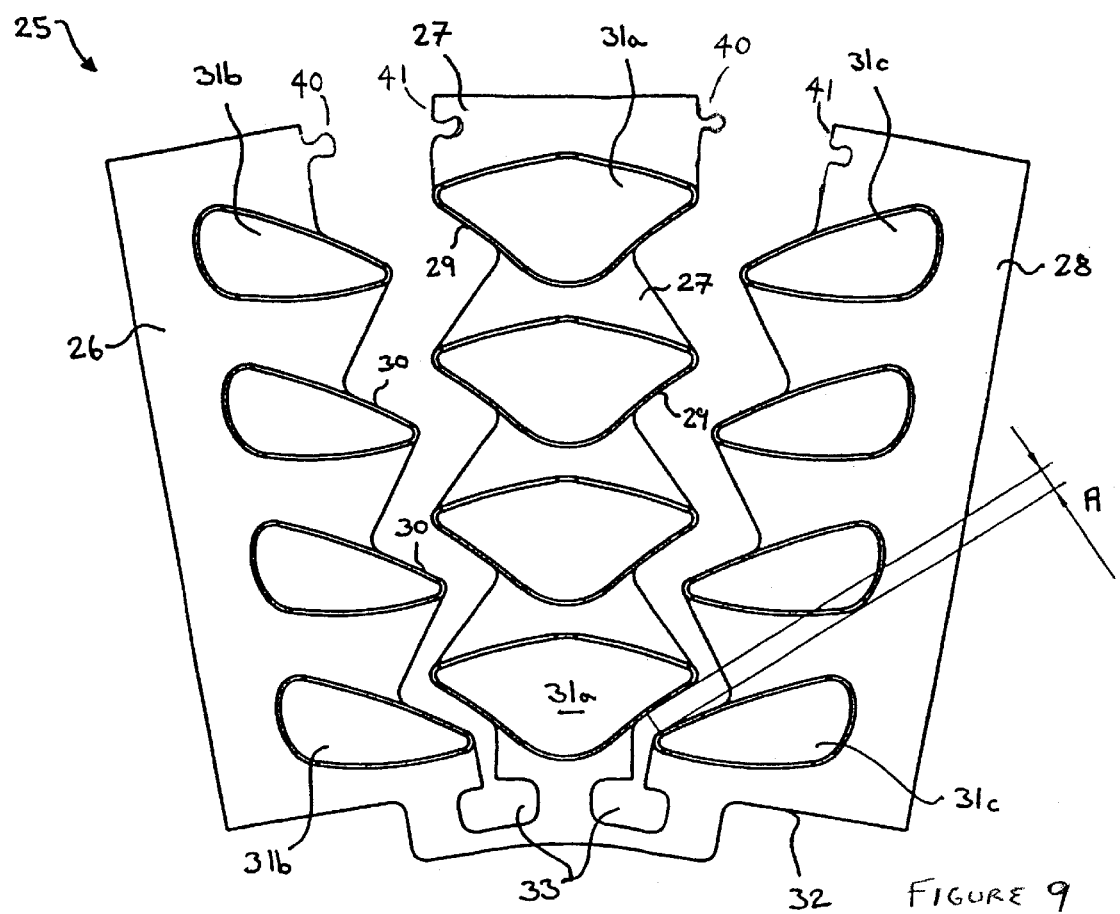
FIG. 9 is a front plan view of a keypad for use in an electronic device with finger connection means according to an example embodiment of the present invention.

FIG. 9 shows a modified embodiment where the keypad may be provided with means 40, 41, to hold the fingers 26, 27, 28 in the closed configuration to enable easier installation of the keypad. These means could take the form of an integrally molded tongue and corresponding aperture on two adjacent fingers so that when the fingers are closed, the tongue engages in the aperture and locks the two fingers together. Other means for holding the fingers in the closed configuration may also be devised.

Although the keypad of the invention described with reference to the preferred embodiment is made from a moulded plastics or rubber material, it will also be appreciated that it could also be made from metal. In this case, the keys are integrally moulded bodies connected by a foil sheet, the keys and foil both being formed from the same material. This keypad is manufactured in a stamping process. However, keypads made using this technique suffer from same problems as those made using a moulding process, namely that the wall thickness of the stamping die between the keys must be greater than a minimum to maintain the integrity of the die and produce a product of an acceptable standard. This means that the keys cannot be positioned closely or contiguously to each other as is possible when a keypad according to the present invention is formed.

It will be appreciated that this invention enables a keypad 25 to be made in a single piece and in which the keys 31 are positioned in close proximity to, or touching other keys 31. This has not been possible to date due to the constraints on the minimum wall thickness that must be maintained when a keypad is moulded or stamped.

Many modifications and variations of the invention falling within the terms of the following claims will be apparent to those skilled in the art and the foregoing description should be regarded as a description of the preferred embodiments only.

What is claimed is:

1. A keypad for use with an electronic circuit board in an electronic device comprising:
    a plurality of splayed fingers; and
    a plurality of keys on each finger;
    wherein the fingers adopt a non-splayed configuration when the keypad is located on an electronic circuit board and installed in said electronic device such that a key on at least one finger is positioned in close proximity to a key on an adjacent finger.

2. A keypad according to claim 1, wherein a key on at least one finger is contiguous with a key on an adjacent finger in the non-splayed configuration.

3. A keypad according to claim 1, wherein the keypad adopts the splayed configuration when unconstrained, the fingers being constrained in the non-splayed configuration when the keypad is installed in said electronic device.

4. A keypad according to claim 1, wherein the keypad is formed from a resiliently deformable material.

5. A keypad according to claim 1, wherein the keypad comprises a unitary component.

6. A keypad according to claim 1, wherein each finger has a zigzag configuration along its edge where it contacts an adjacent finger when in the non-splayed configuration.

7. A keypad according to claim 1, wherein the keys on each finger extend to at least one edge where it contacts an adjacent finger when in the non-splayed configuration.

8. A keypad according to claim 1, further comprising an aperture in the keypad in a crook between a pair of fingers.

9. A keypad according to claim 1, wherein co-operating means are provided on two adjacent fingers to hold them in the non-splayed configuration.

10. A keypad according to claim 9, wherein the co-operating means comprises a tongue and aperture through which the tongue extends in the non-splayed configuration.

11. An electronic device comprising:
    a display;
    at least one softkey; and
    a keypad, the keypad comprising:
        a plurality of splayed fingers; and
        a plurality of keys on each finger;
    wherein the fingers adopt a non-splayed configuration when the keypad is located on an electronic circuit board and installed in said communication device such that a key on at least one finger is positioned in close proximity to a key on an adjacent finger.

12. An electronic device according to claim 11, further comprising a casing, wherein two or more keys protrude through a single aperture in the casing.

13. An electronic device according to claim 12, wherein said two or more keys are formed in a row.

14. An electronic device according to claim 13, wherein a number of rows extend through a corresponding number of openings in the casing.

15. A mobile telephone communication device comprising:
    a display;
    at least one softkey; and
    a keypad, the keypad comprising:
        a plurality of splayed fingers; and
        a plurality of keys on each finger;
        wherein the fingers adopt a non-splayed configuration when the keypad is located on an electronic circuit board and installed in said communication device such that a key on at least one finger is positioned in close proximity to a key on an adjacent finger.

16. A method of installing a keypad in an electronic device comprising:
    a) taking the keypad having fingers with a splayed configuration from a mould;
    b) moving the fingers together to form a non-splayed configuration; and
    c) mounting the keypad on an electronic circuit board in the electronic device such that the fingers are retained in said non-splayed configuration.

* * * * *